(12) United States Patent
Belknap et al.

(10) Patent No.: US 10,436,575 B2
(45) Date of Patent: Oct. 8, 2019

(54) SYSTEMS AND METHOD FOR FILLING APPAREL WITH GASES, FLUIDS, OR FLUID-LIKE SOLIDS TO ENABLE THE ACCURATE THREE-DIMENSIONAL CAPTURE OF APPAREL BY THREE-DIMENSIONAL SCANNING AND STEREO PHOTOGRAMMETRY

(71) Applicant: Clothscan LLC, Chicago, IL (US)

(72) Inventors: John Thomas Belknap, Chicago, IL (US); Kenji Shimada, Pittsburgh, PA (US)

(73) Assignee: Clothscan LLC, Chicago, IL (US)

( * ) Notice: Subject to any disclaimer, the term of this patent is extended or adjusted under 35 U.S.C. 154(b) by 0 days.

(21) Appl. No.: 16/056,471

(22) Filed: Aug. 6, 2018

(65) Prior Publication Data

US 2019/0137258 A1 May 9, 2019

Related U.S. Application Data

(60) Provisional application No. 62/541,388, filed on Aug. 4, 2017.

(51) Int. Cl.
| | |
|---|---|
| *H04N 17/00* | (2006.01) |
| *H04N 17/06* | (2006.01) |
| *G01B 11/02* | (2006.01) |
| *G01B 11/24* | (2006.01) |
| *G06T 7/62* | (2017.01) |
| *H04N 13/282* | (2018.01) |
| *G06Q 30/06* | (2012.01) |
| *G06F 16/538* | (2019.01) |
| *G01B 11/25* | (2006.01) |

(Continued)

(52) U.S. Cl.
CPC ............. *G01B 11/02* (2013.01); *G01B 11/24* (2013.01); *G01B 11/2513* (2013.01); *G01B 11/2545* (2013.01); *G06F 16/538* (2019.01); *G06Q 30/0621* (2013.01); *G06T 7/62* (2017.01); *H04N 13/282* (2018.05); *A41B 1/00* (2013.01); *A41D 1/06* (2013.01); *G06T 2207/10012* (2013.01)

(58) Field of Classification Search
CPC ............. A41H 1/02; A41D 1/06; G01B 11/02
USPC ........ 348/48, 42, 61, 86, 135, 180; 702/167, 702/35
See application file for complete search history.

(56) References Cited

U.S. PATENT DOCUMENTS 9,462,838 B1 * 10/2016 Smith ...................... A41H 1/02

* cited by examiner

*Primary Examiner* — Jefferey F Harold
*Assistant Examiner* — Jean W Desir
(74) *Attorney, Agent, or Firm* — AU LLC; Adam E. Urbanczyk

(57) ABSTRACT

The present invention provides a system for accurate three-dimensional (3D) capture of apparel by 3D scanning and stereo photogrammetry. One or more flexible deflated bladders are inserted into an apparel and inflated by a filling media source. The bladder is inflated to measure at least one of size of the apparel, tensile strength of the fabric of the apparel, or cross section perimeter of the apparel. A rotating structure is anchored onto the stable structure to uniformly rotate all the fixed points of the apparel. One or more 3D scanners are configured to scan the inflated apparel on the stable structure and export the scanned data to one or more software applications. The processor retrieves the 3D scanned dimensional data from a searchable database and compares the given apparel's dimensions with one or more apparels' dimensions in the database to provide the customer with size recommendation via a display.

18 Claims, 17 Drawing Sheets

(51) Int. Cl.
*A41D 1/06* (2006.01)
*A41B 1/00* (2006.01)

SYSTEMS AND METHOD FOR FILLING APPAREL WITH GASES, FLUIDS, OR FLUID-LIKE SOLIDS TO ENABLE THE ACCURATE THREE-DIMENSIONAL CAPTURE OF APPAREL BY THREE-DIMENSIONAL SCANNING AND STEREO PHOTOGRAMMETRY

FIELD OF THE INVENTION

The invention generally relates to systems and methods of measuring objects—in this case, clothing apparel—using three-dimensional ("3D") scanning and stereo photogrammetry methods.

BACKGROUND OF THE INVENTION

Online apparel shopping is typically a process of trial and error for the online shopper. Apparel sizes vary among apparel manufacturers and therefore online consumers either buy several sizes, or several cut variations, of a desired article to try on at home and then return the versions which do not fit. This trial-and-error approach is one of the main reasons why the online apparel market is still very small compared to the retail apparel market.

Apparel sizes and patterns continually change over time such that online apparel consumers cannot always rely on the known fit of previous purchases of the same apparel, or other apparel from the same manufacturer or designer. Apparel dimensions can vary greatly even within a given manufacturer's single size offering, presenting the online shopper with additional uncertainty regarding the apparel's assumed fit.

An example of different fitting apparel within a given apparel size can be found in many popular jean cuts. Typically, a jean size is listed by the waist size and the inseam length, e.g., 32"×34", which indicates a 32" circumference at the waist and a 34" long inseam. A popular jean cut is a straight cut and another popular jean cut is a skinny cut. Each type of cut changes the perimeter of the fabric at the thigh, knee, and other parts of the body such that it fits differently on the same body, or in some wearers' cases, cannot be worn at all despite the same waist size and inseam length. Typically, a skinny cut is narrower than a straight cut and therefore the online shopper must decide with some uncertainty between different cuts or shapes in addition to aforementioned variations in size listed for each clothing article.

Currently, apparel is either (i) measured manually by a person with a linear measurement device such as a ruler or flexible measuring tape; or (ii) based on two-dimensional ("2D") cut or sew patterns provided by the manufacturer or designer. Human errors can result in small variations in measurements which can affect a buyer's decision to purchase an article of apparel online. Dimensions based on 2D cut or sew patterns do not always consider human machine manufacturing error or other issues associated with assembly of the 2D shapes. The material properties of the fabric, plastic, or other materials incorporated in the apparel may also affect the assembly process and change the actual shape of the apparel despite the apparel design configuration. Further, this apparel measurement information is not always readily available and is often considered proprietary to a manufacturer or designer.

SUMMARY OF THE INVENTION

The present invention is a system and method to create virtual 3D models of apparel articles by filling the apparel article with gasses, fluids, fluid-like solids, or granular solid media, capturing the apparel in a filled or inflated state, and then using 3D scanning and/or stereo photogrammetry to obtain measurement data thereof. An apparel article is filled with one or more types of media such that the article is filled to the maximum extent desired for scanning. A flexible membrane made from a variety of materials is used to cover any openings in the article to prevent the media from spilling or causing the article to move significantly during measurement. The flexible membranes are applied to the article in at least two ways. A first method is closing the openings in the article by attaching a flexible membrane prior to filling the article with media. A second method involves using a specially shaped envelope to insure the article is stretched where possible in all directions to allow for the measurement of the entire surface of the article. A third method is to fill the article with a medium at a rate faster or equal to the rate at which the medium leaks out from the article such that article is filled or stretched. Once the article is filled or stretched to the desired level, a 3D scan may be made of it.

This new 3D method minimizes or eliminates the need to use an article's original 2D sewing or cutting pattern to designate article sizing and confirms the actual dimensions of the article rather than relying on the fidelity of its manufacturer's disclosed specifications. A secondary benefit is to confirm the characteristics of the apparel under different pressures and loads to aid in predicting how the apparel may react when worn without destructive testing or additional samples of the apparel material.

BRIEF DESCRIPTION OF THE DRAWINGS

The accompanying figures and drawings, incorporated into and forming part of the specification, serve to further illustrate the present invention, its various principles and advantages, and its varying embodiments.

DETAILED DESCRIPTION

This disclosure is not limited to the systems, devices, and methods described, as these may vary. The terminology used in the description if for the purpose of describing the versions or embodiments only and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

In one embodiment, one or more flexible deflated bladders are inserted into an apparel and inflated by a filling media source. The apparel includes, but is not limited to a pair of pants, a clothing top, etc. The bladder is inflated to measure at least one of size of the apparel, tensile strength of the fabric of the apparel, or cross section perimeter of the apparel. A stable structure is configured to keep the inflated apparel stabilized and stationary. The stable structure acts as a skeleton of a typical person who wears the apparel. A rotating structure is anchored onto the stable structure to uniformly rotate all the fixed points of the apparel. One or more 3D scanners are configured to scan the inflated apparel on the stable structure and export the scanned data to one or more software applications. The software application removes unwanted data points and other structures which are not a part of the apparel and analyses the scan to extrapolate dimensions from the scanned data. The processor retrieves the 3D scanned dimensional data from a searchable database and compares the given apparel's dimensions with one or more apparels' dimensions in the database to provide the customer with size recommendation via the display or Application Programming Interface (API), wherein the size recommendation is started by inputting apparel reference ID by the customer.

Figure 1:
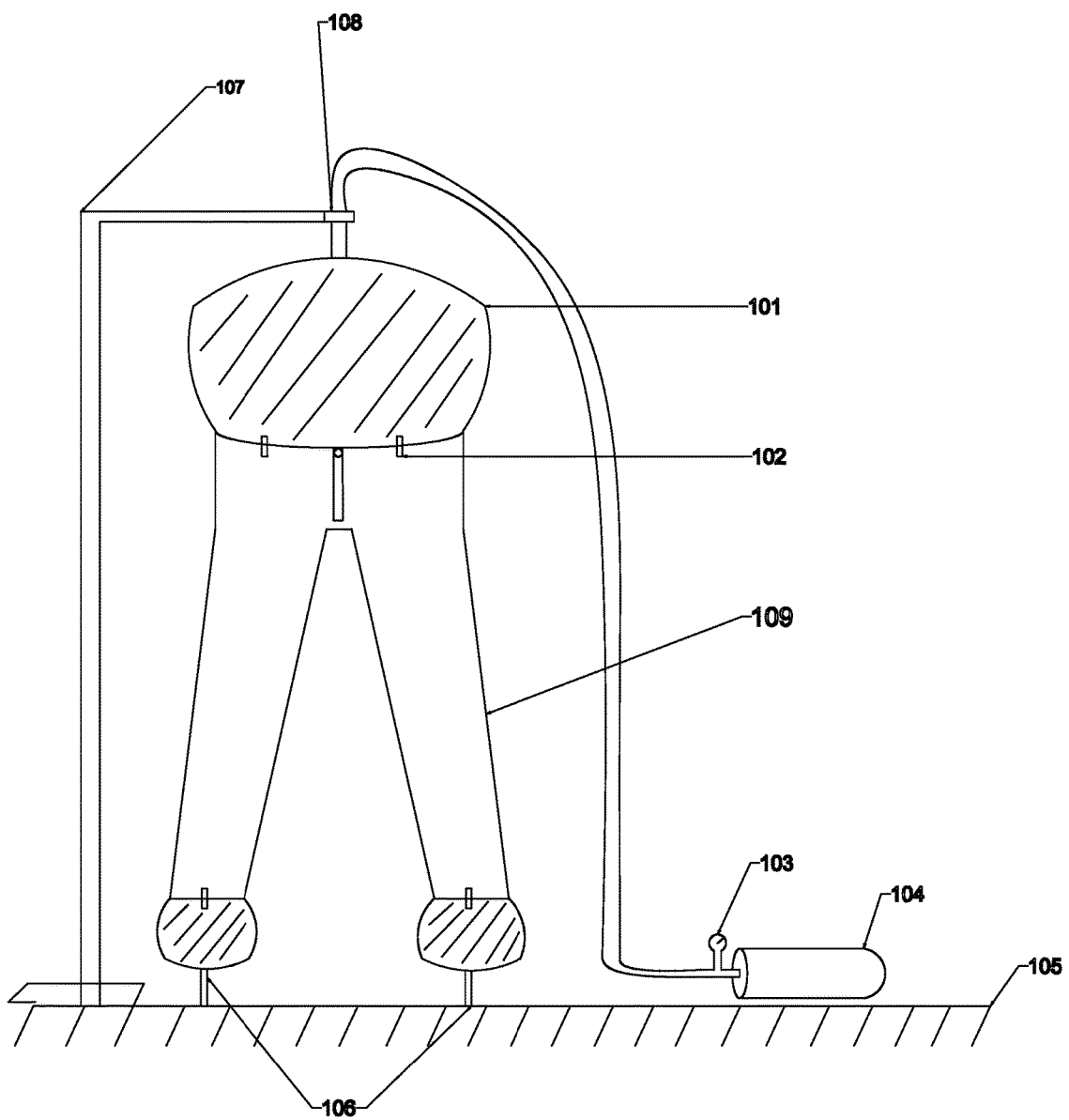
FIG. 1 depicts an exemplary apparatus used to scan a pair of pants while ensuring the pants are being scanned true to fit.

FIG. 1 depicts an exemplary apparatus used to scan a pair of pants. A flexible, deflated bladder 101 is inserted into a pair of pants 108 and is inflated by a filling media source—in this case, an air compressor 104—once the bladder has been placed fully into the pants 108. The pressure of the bladder is monitored and maintained by a pressure regulator with a pressure gauge 103. The bladder is inserted into the pants 108 and is held at the bottom by cable fastening devices 106.

The bladder 101 is also maintained at the waist by fasteners or pins 102. The bladder 101 is held up by a fixed structure 107 secured to the ground 105 that maintains the system in a stationary position. The bladder 101 makes a form fit for the pants such that they can be subsequently scanned, and the 3D data recorded and interpreted.

Figure 2:
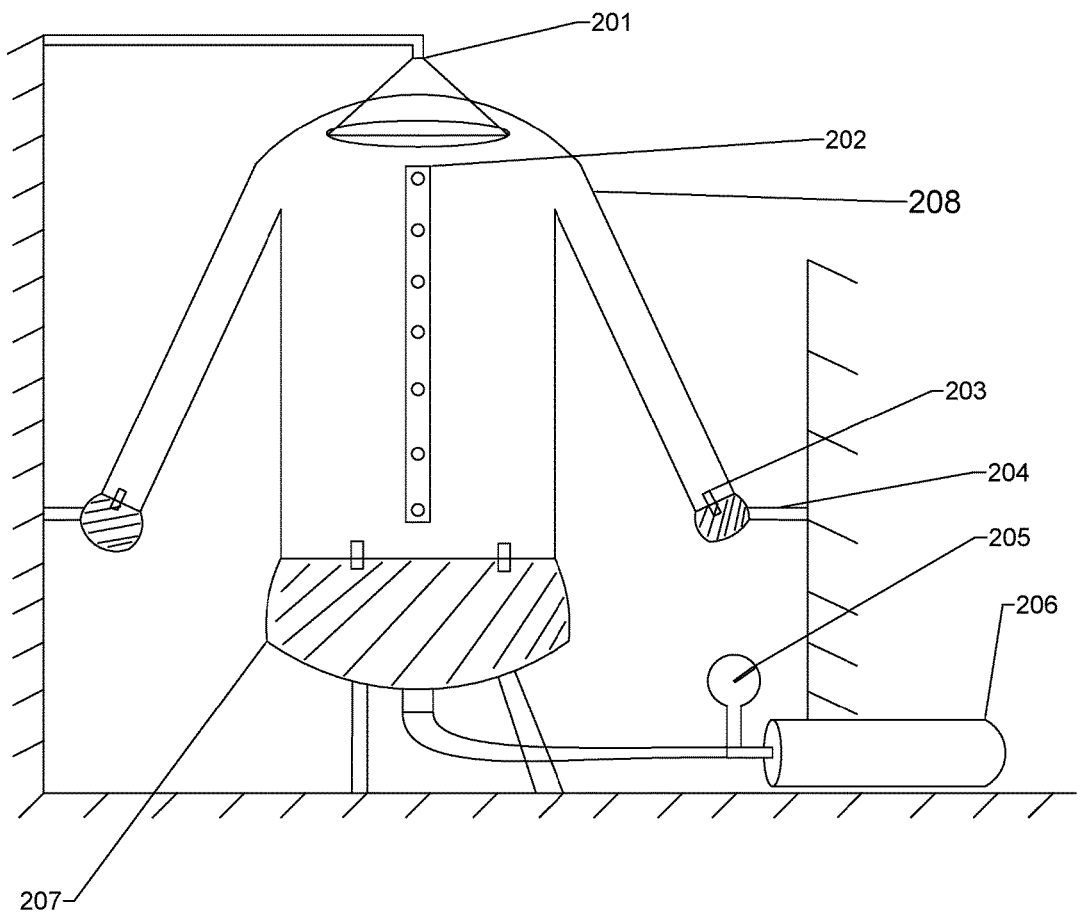
FIG. 2 depicts an exemplary apparatus used to scan a shirt or blouse while ensuring the top is scanned true to fit.

FIG. 2 depicts an exemplary system used to scan a shirt or blouse. A flexible deflated bladder 207 is inserted into a clothing top 208 (e.g., shirt, or blouse) top and is inflated by a filling media source—in this case, a compressed air tank 206—once the deflated bladder is fully inserted into the clothing top. The pressure of the bladder is monitored and maintained by a pressure regulator with a pressure gauge 205. The inserted bladder is maintained within the clothing top by clip fasteners 204. The shirt is held upright and anchored by a fixed structure 201 that keeps the shirt at a stationary location. The bladder is secured within the shirt by clips at the ends of the arm sections 203. For buttoned shirts, a piece of tape or some other fastening system may be used down the front seam 202 of the shirt to keep it at its true-to-fit size. The bladder is then inflated to make a form fit on the article such that they can be scanned, and the 3D data recorded and interpreted.

Figure 3:
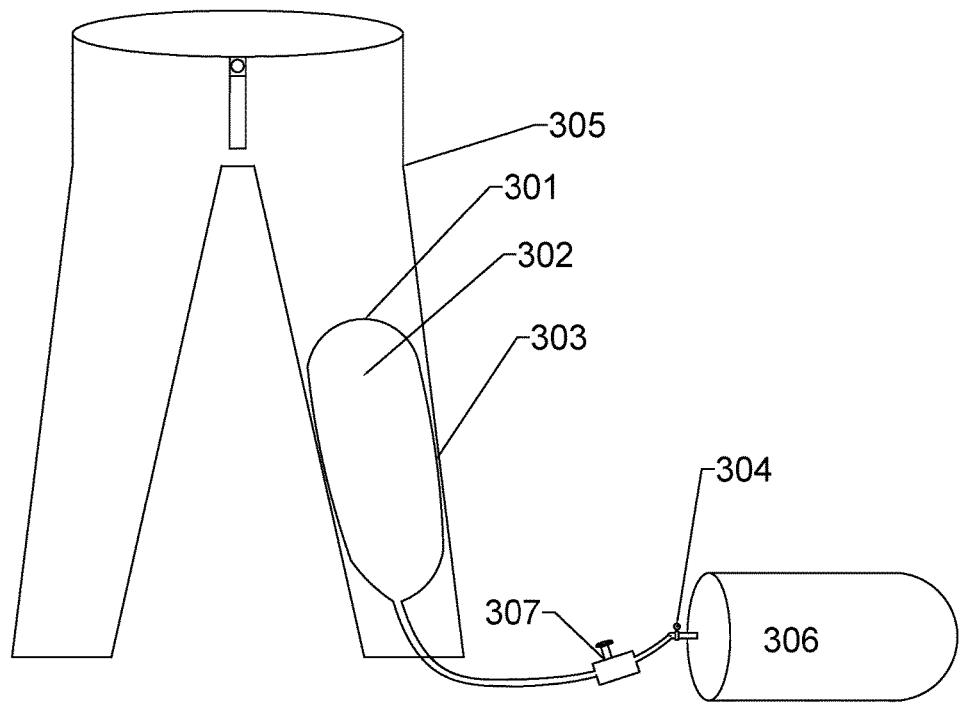
FIG. 3 depicts an exemplary system to test tensile strength of fabric by inserting an expandable bladder into the apparel that inflates and measures the stress on the fabric.

FIG. 3 depicts an exemplary system to test tensile strength of fabric by inserting an expandable bladder into apparel that inflates and measures the stress on fabric. A flexible inflatable bladder 301 is inserted into a pair of pants 305 to measure the fabric's tensile strength. The bladder is connected to a filling media source—in this case, an air compressor with a tank or a fan 306—with a manometer 304 measuring the pressure and a pressure regulator 307 to maintain or change to a desired pressure. The bladder 302 has a maximum diameter greater than the test fabric 303 covering the bladder, allowing for the manometer to measure the pressure which is related to the tensile strength of the fabric and not the bladder. The tensile strength of the fabric may be calculated using recorded pressures and the change in circumference of a measured portion of the apparel.

Figure 4:
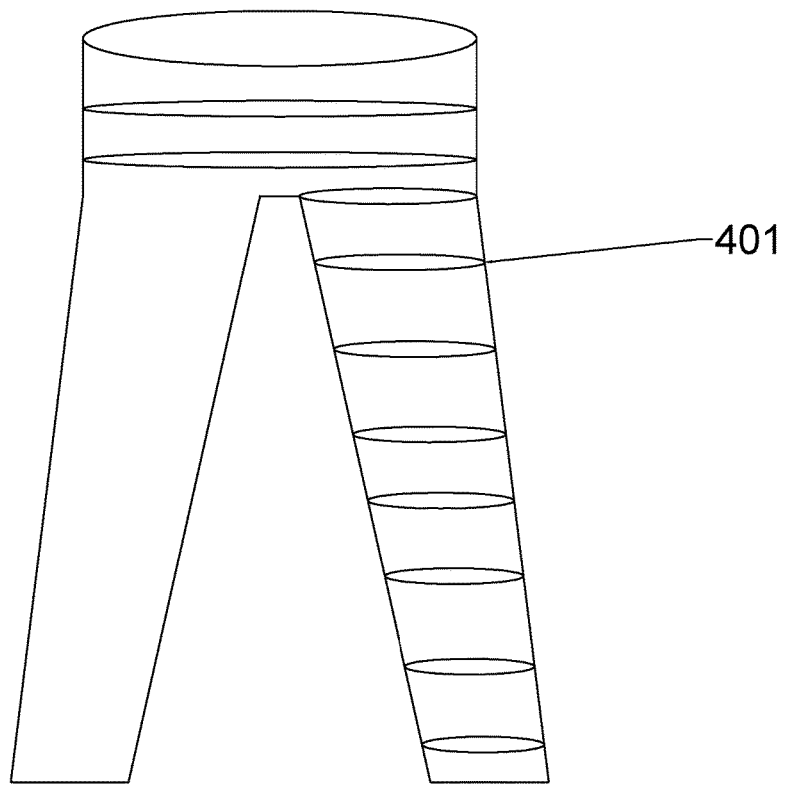
FIG. 4 depicts one type of the cross-sectional analysis performed on a pair of pants from the 3D scan data.

FIG. 4 depicts an exemplary cross-sectional analysis of a pair of pants from the 3D scan data. The 3D scan data uses cross sectional area of different regions of the apparel to create accurate full body measurements 401. The cross-sectional perimeter is determined by generating various planes and calculating the intersection of those planes with the 3D scan data. These cross-sectional perimeters and their corresponding coordinates are recorded for various brands and sizes of apparel to create an incredibly accurate representation of how sizes vary between differing brands allowing customers to make more educated shopping choices.

Figure 5:
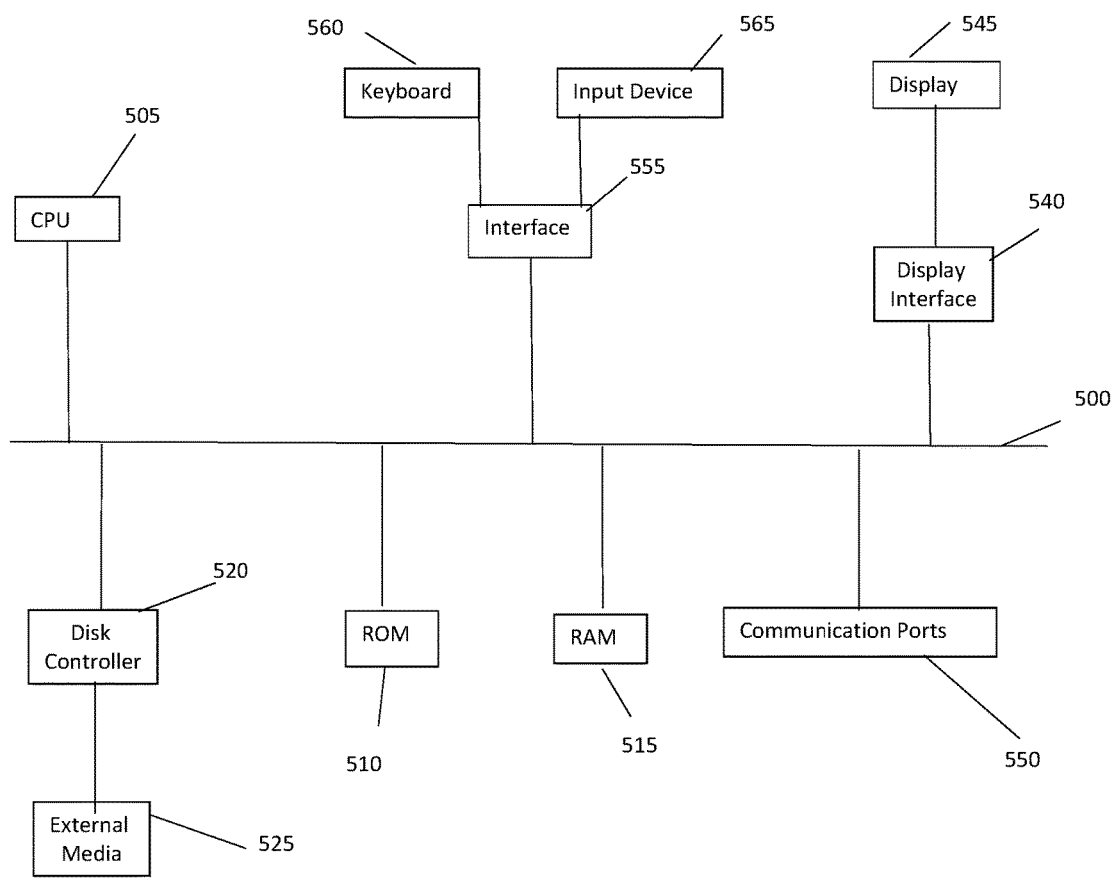
FIG. 5 depicts a block diagram of exemplary internal hardware which may be used to contain, collect, and process data which is captured by the scanning or stereophotogrammetrical methods.

FIG. 5 depicts a block diagram of exemplary internal electronic hardware that may be used to contain, collect, and process data that is captured by the system described above. A bus 500 serves as the main information highway interconnecting the other illustrated components of the hardware. A CPU 505 is a processor that performs calculations and logic operations required to execute calculations. Read only memory (ROM) 510 and random-access memory (RAM) 515 constitute examples of memory devices. A controller 520 provides an interface between with one or more optional tangible, computer readable memory devices 525 and the system bus 500. These external memory devices 525 may include, for example, an external or internal DVD or CD ROM drive, a hard drive, flash memory, a USB drive, or the like. These various drives and controllers are optional devices. Additionally, the memory devices 525 may be configured to include individual files for storing any software modules or instructions, auxiliary data, common files for storing groups of results or auxiliary, or one or more bases for storing the resulting information, auxiliary data, and related information as discussed above. Communication ports 550 may be used to connect the system to a computer network. A display interface 540 allows system output to be viewed on a display 545. An input interface 555 enables the user to provide commands through a keyboard 560 or other input device, such as 3D scanning systems or stereo photogrammetry systems 565, to the system.

Figure 6:
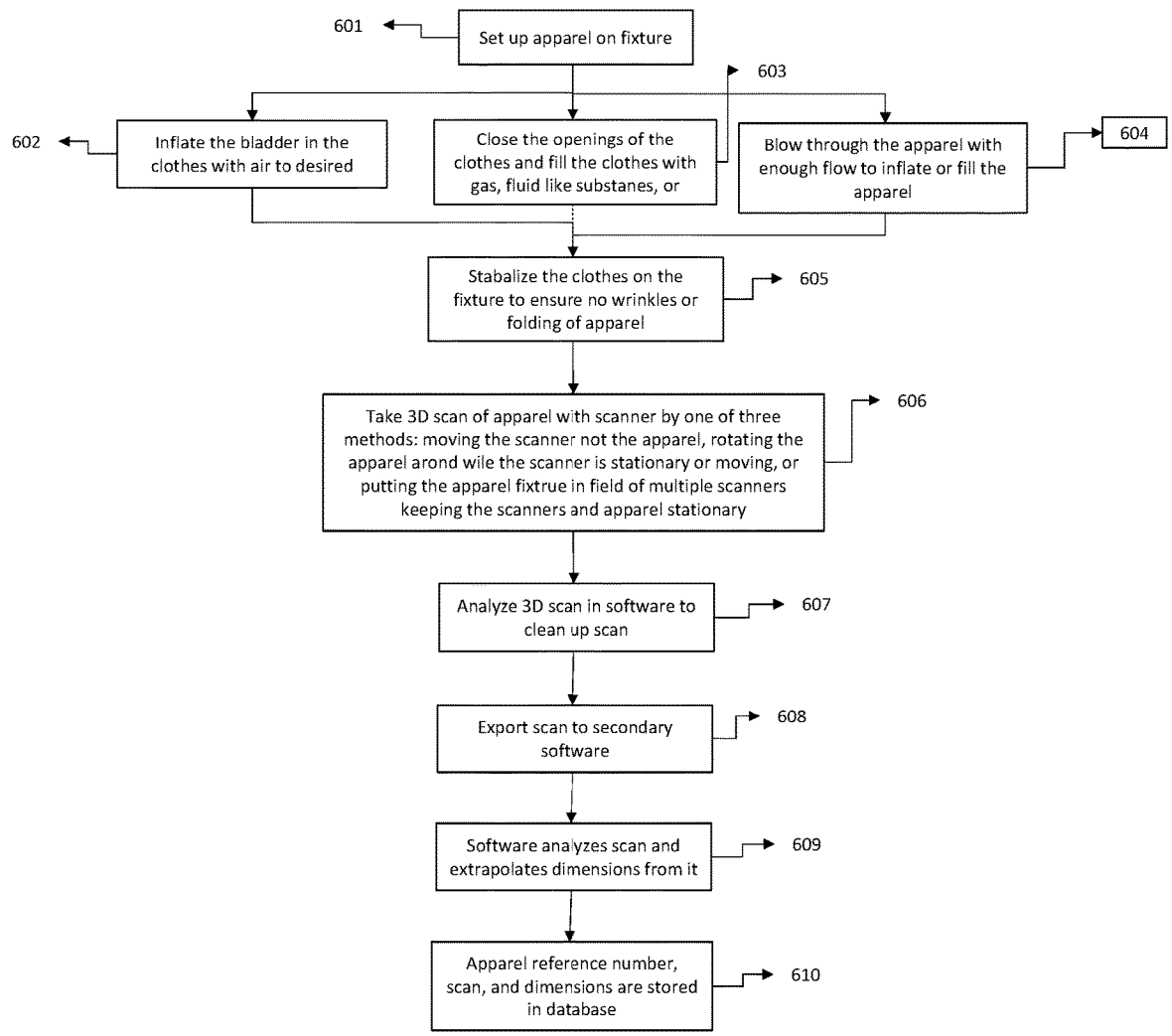
FIG. 6 depicts exemplary steps to set up an apparel article for 3D data capture and to enter apparel data into a database to allow for size analysis and recommendation.

FIG. 6 depicts an exemplary method for taking a scan of a piece of apparel which can be used to create a database of apparel dimensions in accordance with the system described herein. A fixture 601 is set up for the apparel item to be set up on which keeps the system stabilized and stationary. One method to inflate the apparel is with a bladder 602. The deflated bladder is inserted fully into the clothes and inflated to the shape of the clothes which gives the clothes a true fit to be scanned. Another method 603 would be to close the openings in the clothes and then inflate the clothes with filling media which would allow for a scan of the true size and shape of the clothing. Another method 604 would be to blow sufficient air through the clothes to inflate or fill the clothes, despite the air leaking out of the clothing's openings, to allow a 3D scan to be taken of the clothes true size and fit. The apparel is then stabilized 605 to the fixture no matter the inflation choice to ensure constant and stationary apparel which will reduce the wrinkling or folding of the apparel. A 3D scanner 606 which includes but is not limited to, a laser, infrared, structured white light scanner takes a scan of the apparel on the apparatus which is filled. The scan is then exported to a software 607 where the scan is cleaned up to remove unwanted data points and any structures scanned that are not a part of the apparel are removed. Then the scan is sent to one or more software applications 608 where the software analyzes the scan and extrapolates dimensions from it 609. After this dimensional data has been compiled the apparel reference ID number and dimensional data is stored in a data base.

Figure 7:
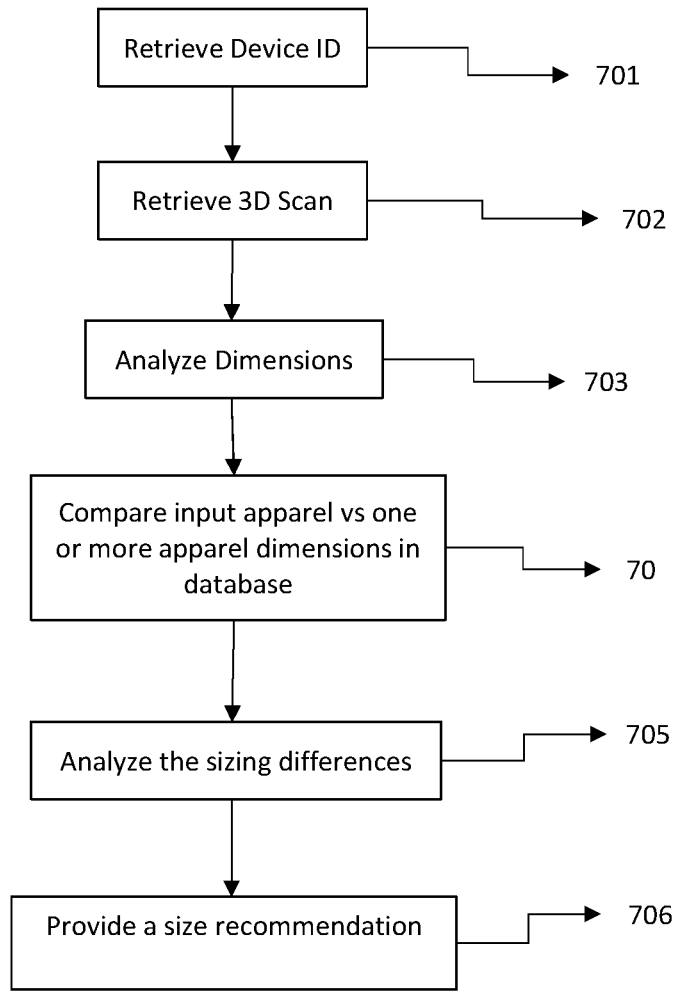
FIG. 7 depicts exemplary steps of the software which provide the customer with a size recommendation.

FIG. 7 depicts exemplary steps of the software which provides the customer with a size recommendation. A size recommendation is generated starting by the customer input of an apparel reference ID 701. The processor then retrieves the 3D scan dimensional data 702 from a searchable database described in FIG. 6. The system then generates measurement information such as cross-sectional perimeter measurements as described in FIG. 4 703 and compiles the data points into real numbers. The processor then compares the given apparel's dimensions to one or more apparel dimensions in the database 704. The software starts to analyze the sizing differences 705 between the two pieces of apparel. The software then finds the critical dimensional differences and analyzes the magnitude of difference in dimensions. Then the processor provides the customer with a sizing recommendation 706 based off the various apparel dimensions in one or more databases, the sizing recommendation being a set of data either illustrated via a display or integrated with other data processing via an application programming interface (API).

Figure 8:
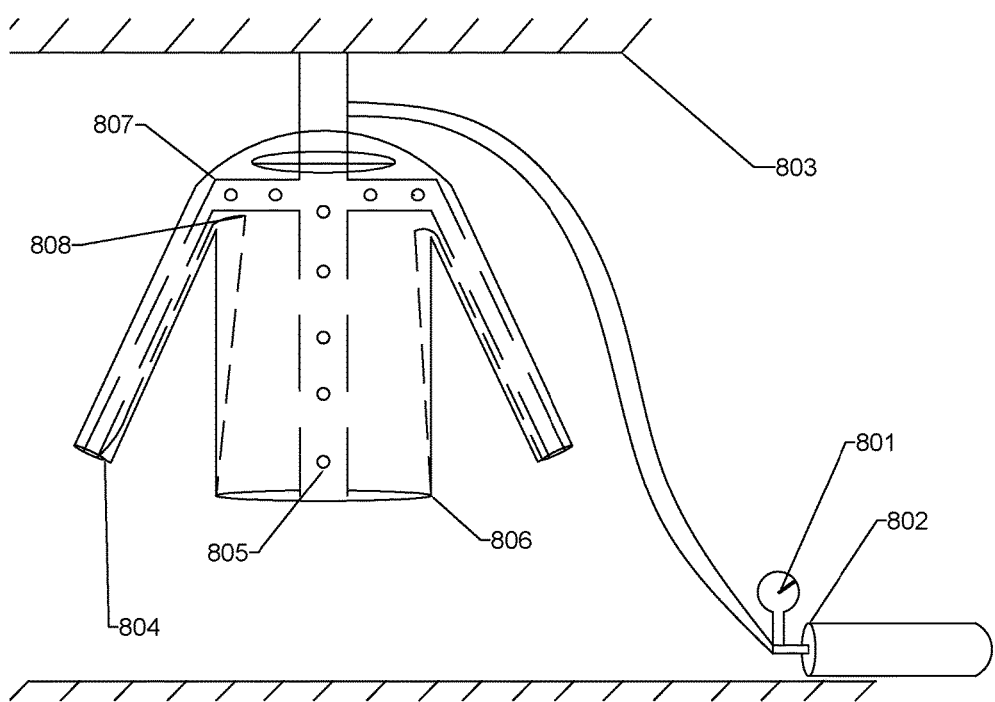
FIG. 8 depicts an exemplary apparatus used to inflate a shirt which is fixed to the ceiling allowing for accurate and stable scans.

FIG. 8 depicts an exemplary system used to inflate a clothing top 806 which is fixed to a ceiling allowing for accurate and stable 3D scans. A stable structure 807 acts as the skeleton of the typical person who would be wearing said clothing top. This stable structure 807 is mounted to a fixed, stationary object 803 on the ceiling which restricts any movement allowing for a very accurate scan to be taken. While FIG. 8 shows air coming through the neck, any filling media solid—e.g., polymer foams or particulate Styrofoam—could come through any apparel manufacturer designed opening or an opening made for the purposes of filling the apparel. The stable structure 807 has holes 805 throughout itself which allow for air to escape evenly to fill the bladder up. In this case, a clothing top 806 is put over the stable structure 807 to be scanned. An inflatable bladder 808 encased the stable structure and is sealed at the end with plates, clamps, or some fastener 804 to create an air tight seal allowing for complete and even inflation. The deflated bladder 808 is inflated once a shirt, blouse, or top is put onto the structure and is expanded by an air compressor or fan 802 by pumping air into the stable structure 807 and allowing air to escape through the designated holes 805. The pressure of the bladder is monitored and maintained by a pressure regulator with a pressure gauge 801.

Figure 9:
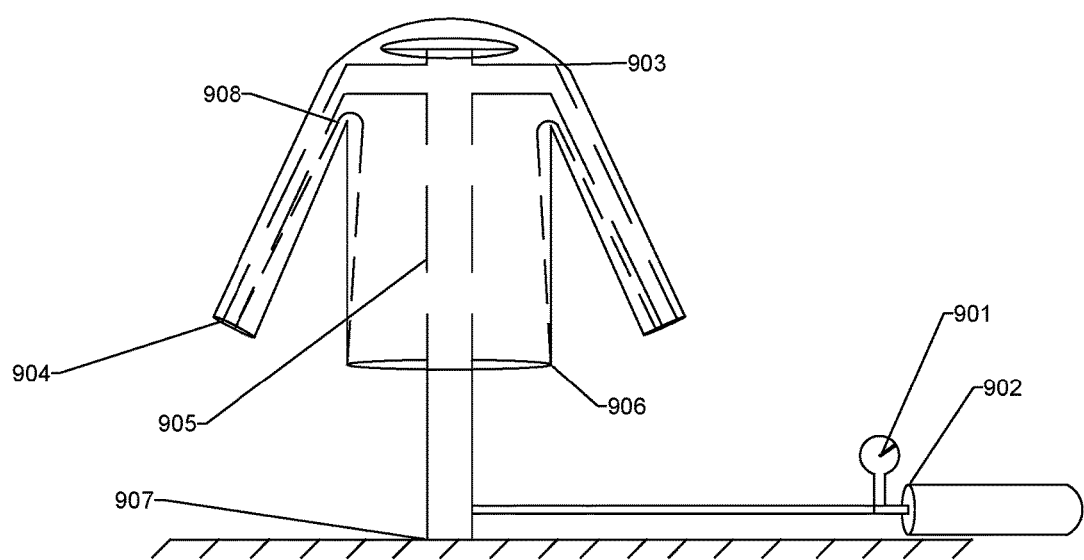
FIG. 9 depicts an exemplary apparatus used to inflate a shirt which is fixed to the floor allowing for accurate and stable scans.

FIG. 9 depicts an exemplary system used to inflate a clothing top 906 which is fixed to the floor allowing for accurate and stable scans. A stable structure 903 acts as the skeleton of the typical person who would be wearing said apparel. This stable structure 903 is mounted to a fixed, stationary object 907 on the floor which restricts any movement allowing for a very accurate scan to be taken. While FIG. 9 shows the air coming through the floor, any filling media could come through any apparel manufacturer designed opening or an opening made for the purposes of filling the apparel. The stable structure 903 has holes 905 throughout itself which allow for air to escape evenly to fill the bladder up. In this case, a shirt 906 is put over the stable structure 903 to be scanned. An inflatable bladder 908 encased the stable structure and is sealed at the end with plates, clamps, or some fastener 904 to create an air tight seal allowing for a precise and accurate scan. A deflated bladder 908 is inflated once a shirt, blouse, or top is fully put onto the fixture and is expanded by an air compressor or fan 902 by pumping air into the stable structure 903 and allowing air to escape through the designated holes 905. The pressure of the bladder is monitored and maintained by a pressure regulator with a pressure gauge 901.

Figure 10:
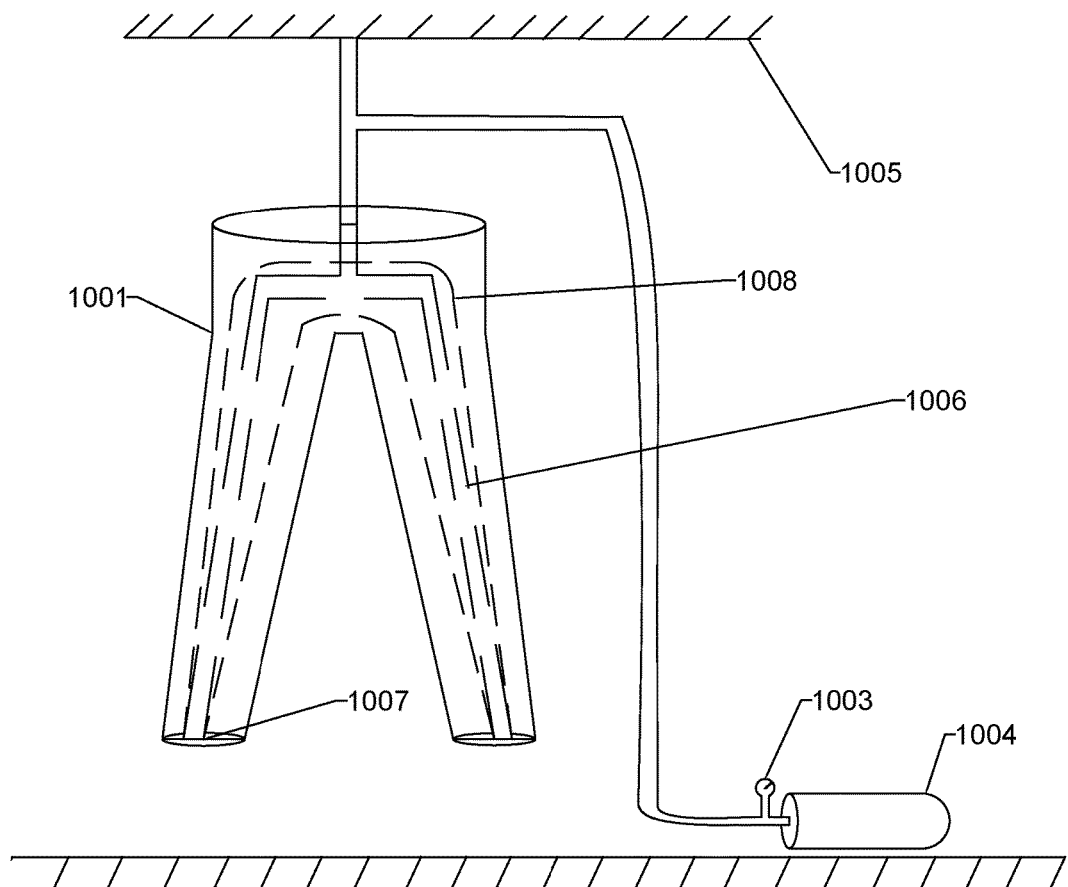
FIG. 10 depicts an exemplary apparatus used to inflate pants which are fixed to the ceiling allowing for accurate and stable scans.

FIG. 10 depicts an exemplary system used to inflate pants 1001 which are fixed to the ceiling allowing for accurate and stable scans. A stable structure 1007 acts as the skeleton of the typical person who would be wearing said apparel. This stable structure 1007 is mounted to a fixed, stationary object 1005 on the ceiling which restricts any movement allowing for a very accurate scan to be taken. While FIG. 10 shows the air coming through the waist, any filling media could come through any apparel manufacturer designed opening or an opening made for the purposes of filling the apparel. The stable structure 1007 has holes 1006 throughout itself which allow for air to escape evenly to fill the bladder up. In this case, pants 1001 are put over the stable structure 1007 to be scanned. An inflatable bladder 1008 encased the stable structure and is sealed at the end with plates, clamps, or some fastener 1002 to create an air tight seal allowing for a precise and accurate scan. A deflated bladder 1008 is inserted into a shirt, blouse, or top and once the apparel is on the fixture an air compressor or fan expands the bladder 1004 by pumping air into the stable structure 1007 and allowing air to escape through the designated holes 1006. The pressure of the bladder is monitored and maintained by a pressure regulator with a pressure gauge 1003.

Figure 11:
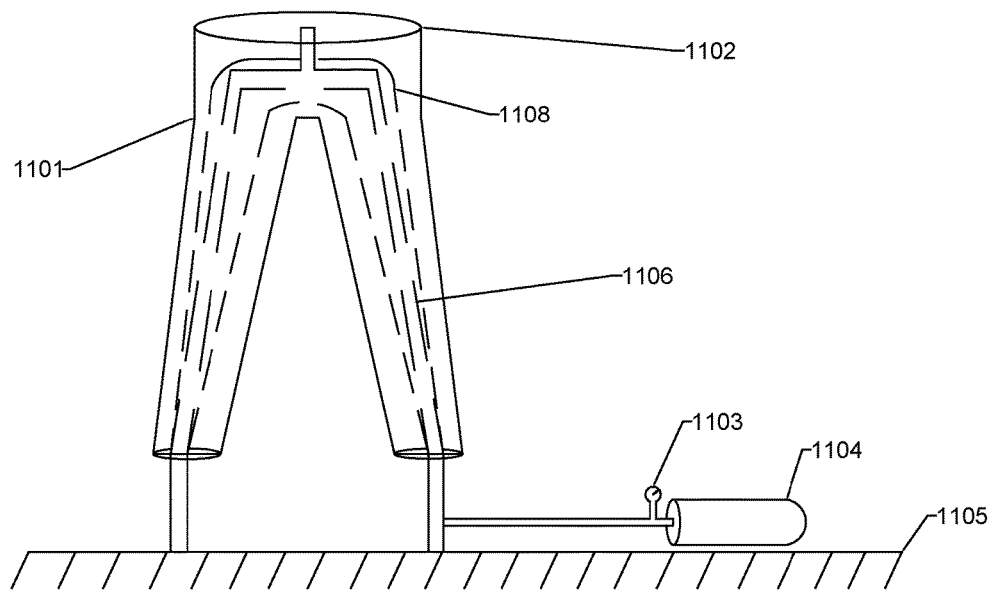
FIG. 11 depicts an exemplary apparatus used to inflate pants which are fixed to the floor allowing for accurate and stable scans.

FIG. 11 depicts an exemplary system used to inflate pants 1101 which are fixed to the floor allowing for accurate and stable scans. A stable structure 1107 acts as the skeleton of the typical person who would be wearing said apparel. This stable structure 1107 is mounted to a fixed, stationary object 1105 on the floor which restricts any movement allowing for a very accurate scan to be taken. While FIG. 11 shows the air input coming from the floor, any filling media could come through any apparel manufacturer-designed opening or an opening made for the purposes of filling the apparel. The stable structure 1107 has holes 1106 throughout itself which allow for air to escape evenly to fill the bladder up. In this case, pants 1101 are put over the stable structure 1107 to be scanned. An inflatable bladder 1108 encased the stable structure and is sealed at the end with plates, clamps, or some fastener 1102 to create an air tight seal allowing for a precise and accurate scan. A deflated bladder 1108 is inserted into a shirt, blouse, or top and is expanded once the apparel is fully on the fixture by an air compressor or fan 1104 by pumping air into the stable structure 1107 and allowing air to escape through the designated holes 1106. The pressure of the bladder is monitored and maintained by a pressure regulator with a pressure gauge 1103 and an air compressor or fan expands the bladder 1104.

Figure 12:
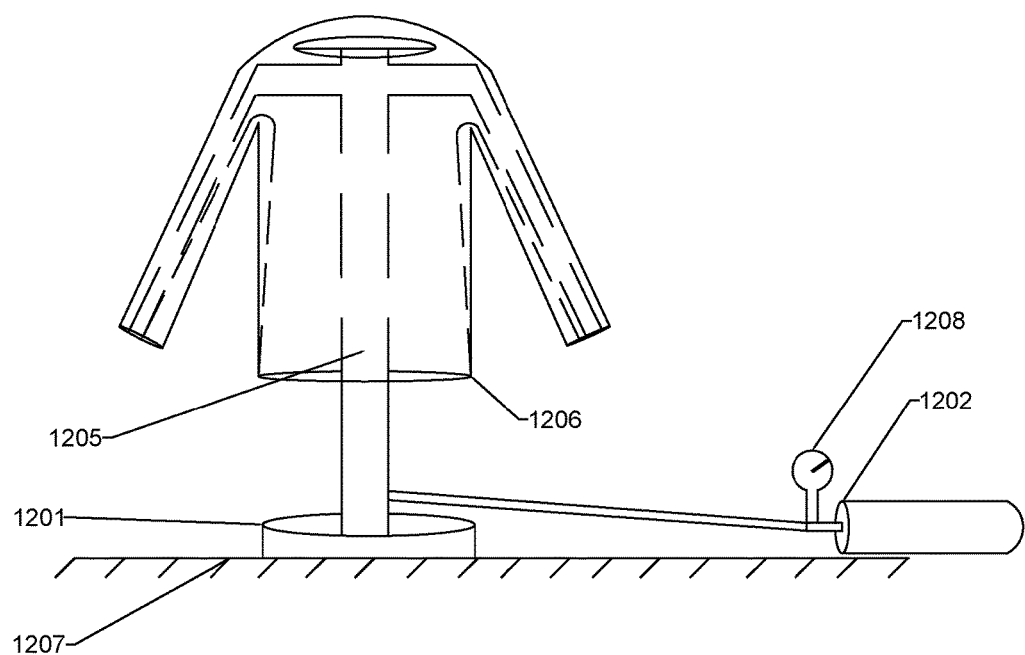
FIG. 12 depicts an exemplary apparatus used to inflate pants which are fixed to the floor allowing for accurate and stable scans.

FIG. 12 depicts an exemplary system used to uniformly rotate all the fixed points of the apparel apparatus to allow for accurate and stable scans. A stable structure 1205 fixes the clothing and bladder to the platform 1201. The apparel is draped over the stable structure; for example, a shirt and bladder 1206 is overlaid on the stable structure 1205. The rotating structure 1201 is anchored onto the level and stable structure 1207. The apparatus is filled and monitored by the same manometer and fan or compressor 1202 method as in previous figures. The rotating fixture 1201 rotates the apparel at a constant and/or controlled speed. This structure allows for the scanner to get an accurate scan with less possibility of human error. The pressure of the bladder is monitored and maintained by a pressure regulator with a pressure gauge 1208.

Figure 13:
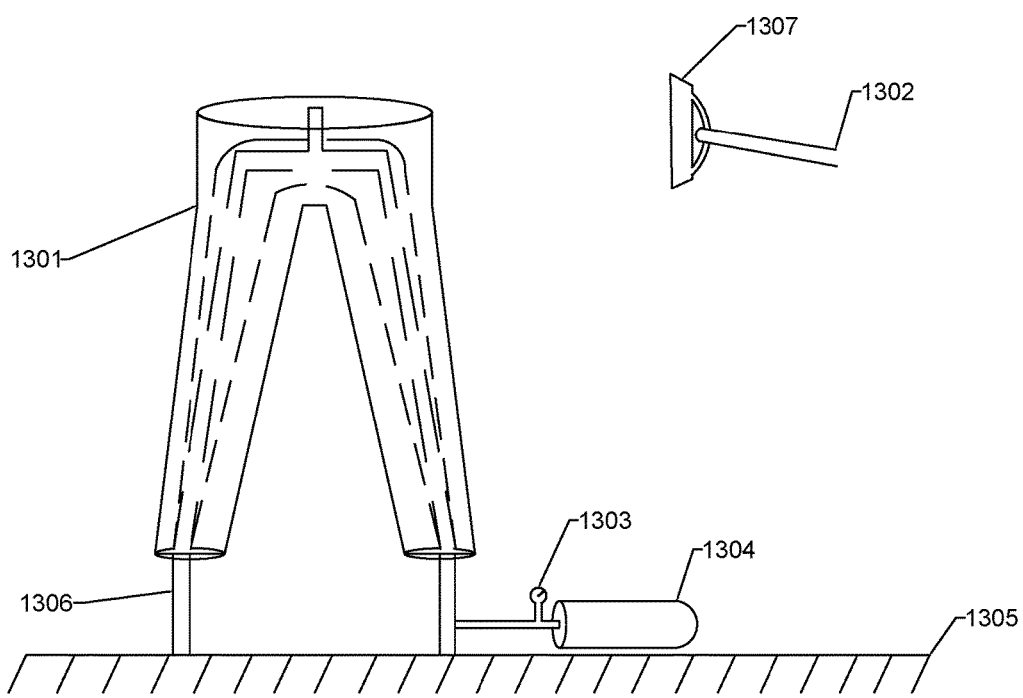
FIG. 13 depicts an exemplary apparatus used to inflate pants which are fixed to the floor allowing for accurate and stable scans and the scanner is moved by a human hand or by a multi-axis robot.

FIG. 13 depicts an exemplary method of scanning pants 1301 using a handheld scanner 1307 that is moved around the apparatus by a person's hand or the end of a multi-axis robot 1302. The pants 1301 are fixed and inflated using the same methods describe in FIG. 11. The person or robot will keep the pants 1301 within the field of view of the scanner 1307 while moving the scanner vertically and radially about the vertical axis of the apparatus 1306 in order to fully capture all surfaces of the pants 1301. The pressure of the bladder is monitored and maintained by a pressure regulator with a pressure gauge 1303 and an air compressor or fan expands the bladder 1304.

Figure 14:
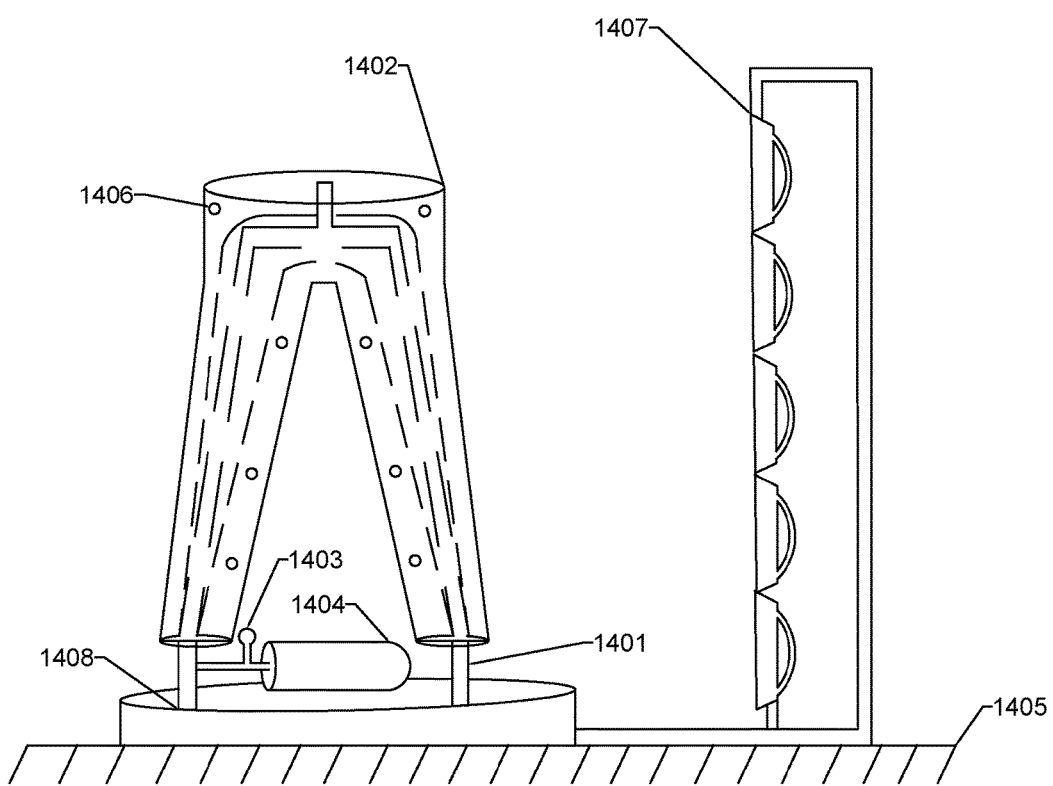
FIG. 14 depicts an exemplary apparatus used to inflate pants which are fixed to a floor with an array of scanners rotating about the vertical axis of the apparatus.

FIG. 14 depicts an exemplary method of scanning pants 1402 using an array of scanners 1407 that is moved by hand or by an external motive force such as an electric motor rotating about the vertical axis of the apparatus 1401. The pants 1402 are fixed and inflated using the same methods describe in FIG. 11. The distance between the vertical axis of the apparatus 1401 and the scanner array 1407 is such that the surface of the pants 1402 are within the combined fields of view of the scanner array 1407 while moving the array vertically and radially in relation to the vertical axis of the apparatus 1401 in order to fully capture all surfaces of the pants 1402. The scanner array 1407 may not have to move vertically if the combined fields of view of the scanners can capture the full vertical height of the pant 1402 surface. Small circular targets 1406 can be used in this figure to aid the scanner or photogrammetry software as fiduciary points used to merge the scans and images together into a single 3D point cloud and image and/or to verify the accuracy of the scan because the targets are a known diameter. The shape of the targets can be shapes other than circles as well. The pressure of the bladder is monitored and maintained by a pressure regulator with a pressure gauge 1403 and an air compressor or fan expands the bladder 1404.

Figure 15:
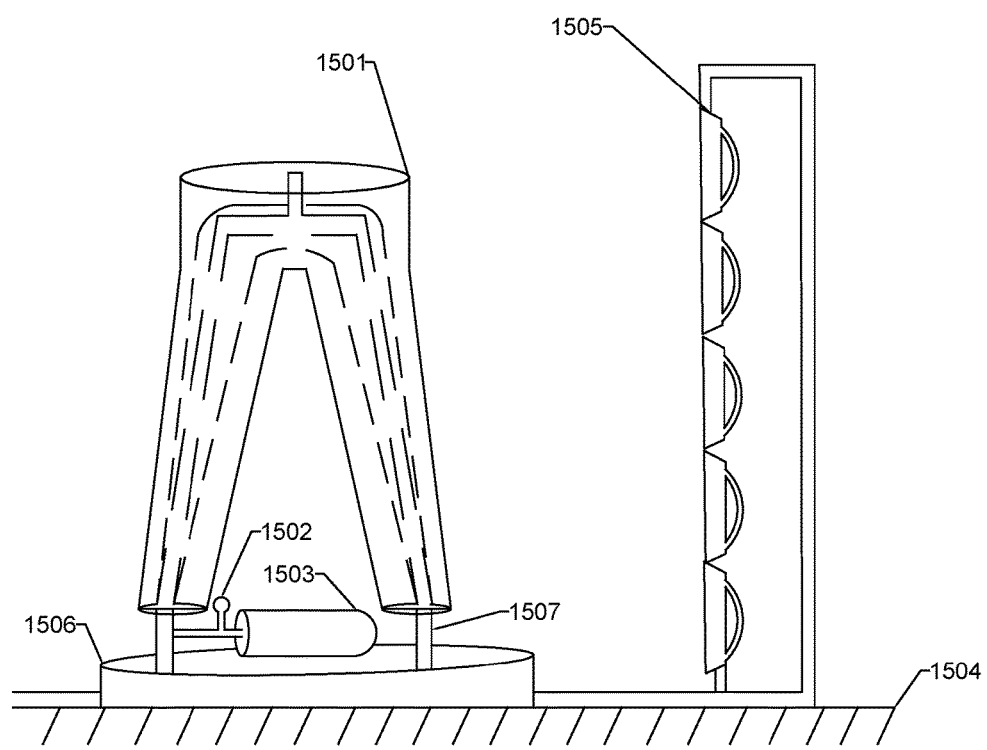
FIG. 15 depicts an exemplary apparatus used to inflate pants which are fixed to a rotating table and the scanner array is stationary or moves vertically for accurate and stable scans.

FIG. 15 depicts an exemplary method of scanning pants 1501 using an array of scanners 1505 that are fixed. A stable structure 1507 fixes the clothing and bladder to the rotating platform 1506. This stable structure is enclosed by the apparel. The pants and bladder 1206 is overlaid on the stable structure 1507. The rotating structure 1506 is anchored onto the level and stable structure 1504. The apparatus is filled and monitored by the same pressure regulator with a pressure gauge 1502 and fan or compressor 1503 method as in previous figures. The rotating fixture 1506 rotates the apparel at a constant controlled speed. The distance between the vertical axis of the rotating table 1506 and the scanner array 1505 is such that the surface of the pants 1501 are within the combined fields of view of the scanner array 1505. The rotating table 1506 will rotate about its vertical center axis while the array remains fixed or moves vertically along the vertical axis of the apparatus 1507 in order to fully capture all surfaces of the pants 1501. The scanner array 1505 may not need to move vertically if the combined fields of view of the scanners can capture the full vertical height of the pant 1501 surface.

FIGS. 8,9,10,11,12,13,14,15 each depicts a solid inner skeleton that gives the apparatus a rigid, one orientation set up. However, the inner skeleton of the fixture can be a deformable or articulating system which allows for the fixture to be set up in various poses and orientations.

FIG. 1,2,8,9,10,11,12,13,14,15 each depicts a singular bladder that is inserted into the clothes while deflated and then inflated once it is fully set up on the inside of the clothes. However, there can be multiple bladders with different sources of filling media which allow for the apparel to have the most realistic human shape as possible.

The exemplary systems illustrated in FIG. 14 and FIG. 15 may utilize only one scanner rather than multiple scanners to capture the exterior surfaces of the apparel.

FIG. 14 and FIG. 15 show either the apparatus or scanner array rotating about the vertical axis of the apparatus. Axes other than those described may be used singularly or in combination in order to capture the exterior surfaces of the apparel.

FIGS. 13,14,15 show a scanner in each figure, but a camera or an array of cameras may also be added to or substitute the scanner or scanner array for the purposes of photogrammetry.

FIGS. 13,14,15 show a general scanner. This application covers several types of scanners that utilize visible or invisible light to determine the relative or absolute coordinates of the surface of the clothing. Some examples of scanner types used are structured white light, structured blue light, infrared and laser scanners but other light-based scanners or combinations thereof maybe used by those skilled in the art. Some existing scanners have a combination of the light-based scanner and camera within one physical system to further integrate the two data types derived therefrom.

Figure 16A:
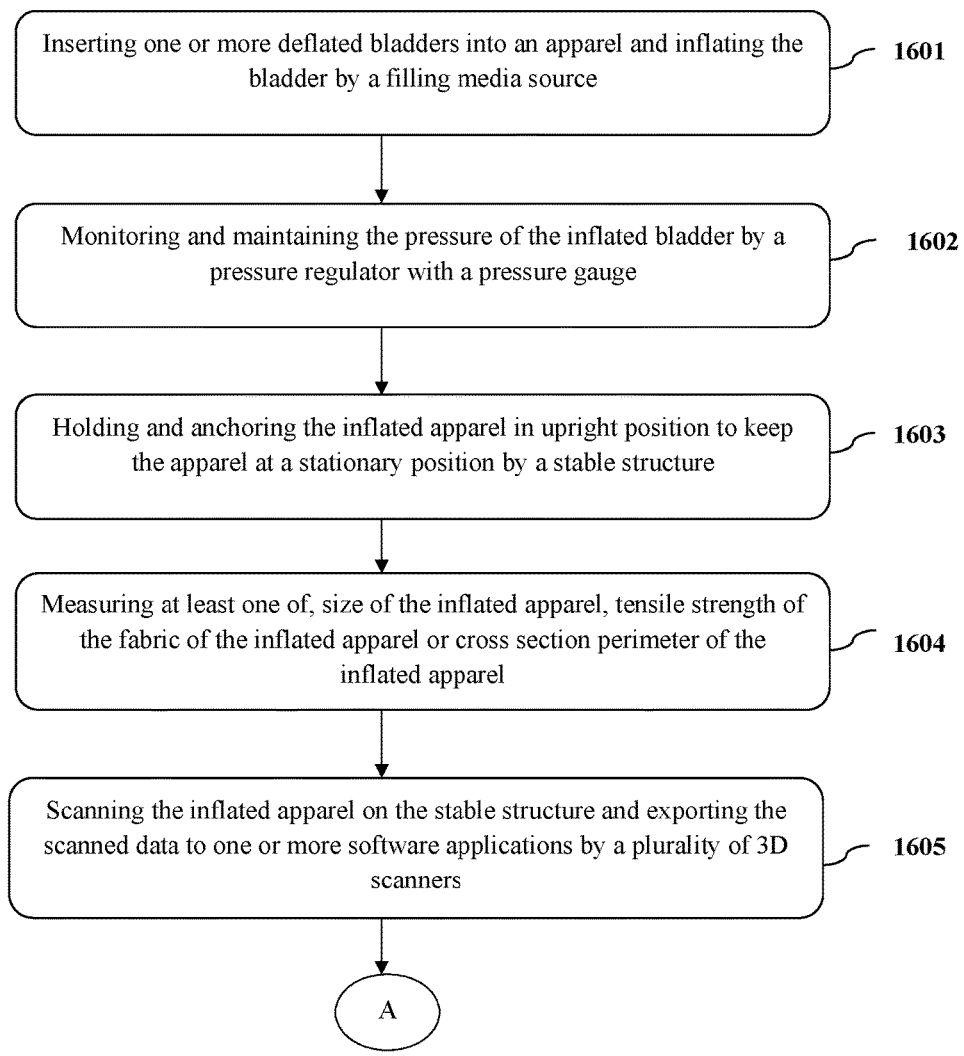
FIG. 16a and FIG. 16b depict a method for accurate 3D capture of apparel by 3D scanning and stereo photogrammetry.
Figure 16B:
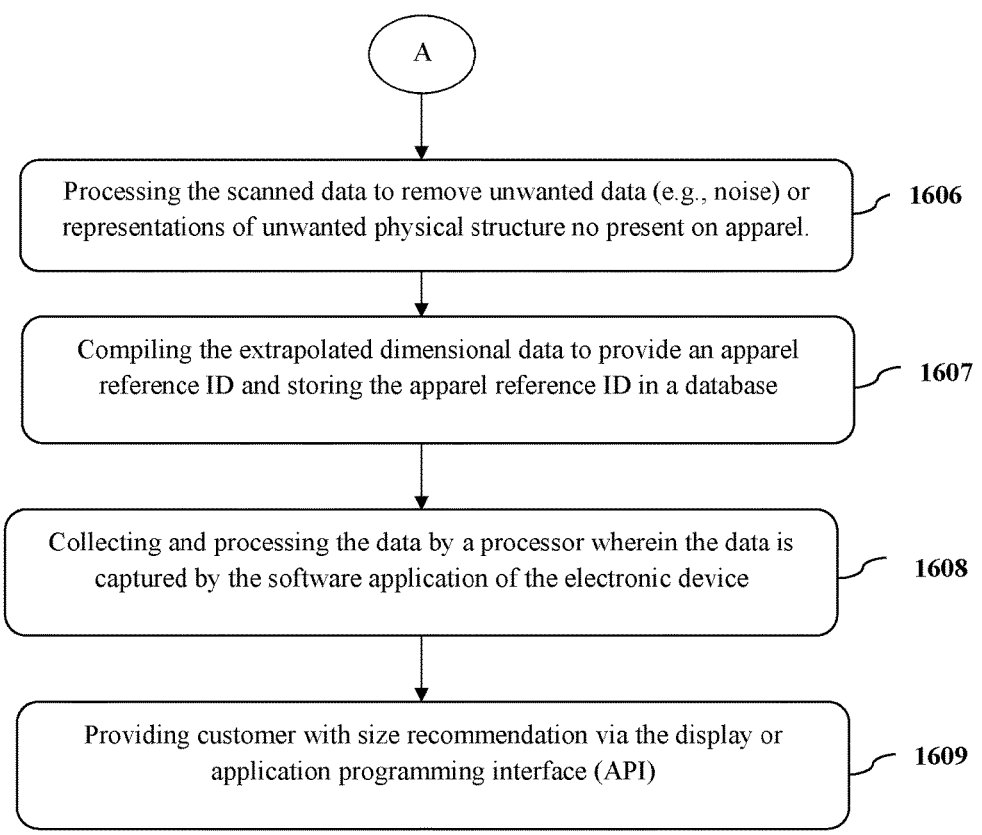

FIG. 16a and FIG. 16b depict a method for accurate 3D capture of apparel by 3D scanning and stereo photogrammetry. The method of accurate 3D capture of apparel by 3D scanning and stereo photogrammetry comprises the steps of inserting one or more deflated bladders into an apparel and inflating the bladder by a filling media source at step 1601. The apparel includes, but is not limited to, a pair of pants, a clothing top etc. At step 1602, the pressure of the inflated bladder is monitored and maintained 101 by a pressure regulator with a pressure gauge 103.

At step 1603, the inflated apparel is held and anchored in upright position to keep the apparel at a stationary position by a stable structure. The stable structure 807 acts as a skeleton of a typical person who wears the apparel. The stable structure 807 is fixed on the stationary object 803, ceiling or on the floor which restricts movement of the apparel. The shape and size of the stable structure 807 varies depending upon the shape and size of the apparel 101. Measuring at least one of, size of the inflated apparel, tensile strength of the fabric of the inflated apparel or cross section perimeter of the inflated apparel at step 1604. The diameter of the bladder 101 is greater than the diameter of the fabric when measuring the tensile strength of the fabric.

At step 1605, inflated apparel on the stable structure is scanned and exported to one or more software applications by a plurality of 3D scanners. Further, removing unwanted data points and other structures which are not a part of the apparel and analyzing the scanned data to extrapolate dimensions from the scanned data at step 1606.

At step 1607, the extrapolated dimensional data is compiled to provide an apparel reference ID 701. The apparel reference ID is stored in a searchable database 704 by the secondary software application 608. At step 1608, the scanned data is collected and processed by a processor, wherein the data is captured by the software application 608 of the electronic device. The processor compares the given apparel's dimensions to one or more apparel dimensions in the database 704. Furthermore, providing customer with size recommendation via the display or application programming interface (API) at step 1609. The size recommendation is started by inputting apparel reference ID 701 by the customer. The software application 608 finds the critical dimensional differences and analyses the magnitude of difference in dimensions of the apparel to provide size recommendation.

While the above system and method for filling apparel with filling media such that the apparel may be measured by 3D scanning or stereo photogrammetry processes has been described with reference to certain embodiments, various modifications thereof will be apparent to those skilled in the art without departing from the scope of the invention.

We claim:

1. A system for three-dimensional capture of apparel by three-dimensional scanning and stereo photogrammetry, the system comprising:
   at least one flexible deflated bladder inserted into an apparel and inflated by a filling media source, wherein the pressure of the inflated bladder is monitored and maintained by a pressure regulator with a pressure gauge, wherein the bladder is inflated to measure at least one of size of the apparel, tensile strength of the fabric of the apparel, or cross section perimeter of the apparel;
   a stable structure configured to keep inflated apparel stabilized and stationary, wherein the stable structure acts as a skeleton of a typical person who wears the apparel, wherein the shape and size of the stable structure varies depending upon the shape and size of the apparel, wherein the stable structure is fixed on the stationary object, ceiling or on the floor which restricts movement of the apparel, wherein a rotating structure is anchored onto the stable structure to uniformly rotate all the fixed points of the apparel;
   at least one three-dimensional (3D) scanner configured to scan the inflated apparel on the stable structure and export the scanned data to at least one software application, wherein the software application is embedded in the processor, the software application removes unwanted data points and other structures which are not a part of the apparel and analyses the scan to extrapolate dimensions from the scanned data, wherein a secondary software application complies the extrapolated dimensional data to provide apparel reference ID and stores in a searchable database; and
   an electronic device having a processor configured to contain, collect, and process data that is captured by the software application and the scanner, wherein the electronic device comprises a RAM, ROM, bus, controller, external memory, communication ports, display, input interface, wherein the input interface enables the user to provide commands through a keyboard or other input device, such as 3D scanning system or stereo photogrammetry systems, wherein the processor retrieves the 3D scanned dimensional data from a searchable database and compares the given apparel's dimensions with at least one apparel's dimensions in the database to provide the customer with size recommendation via the display or Application Programming Interface (API), wherein the size recommendation is started by inputting apparel reference ID by the customer.

2. The system of claim 1, wherein the apparel includes a pair of pants, wherein the deflated bladder is inserted into the pair of pants and is held at the bottom by a cable fastening device, wherein the bladder is maintained at the waist of the pair of pants by a plurality of fasteners or pins and a stable structure is secured to the ground to maintain the pair of pants in a stationary position.

3. The system of claim 1, wherein the apparel includes a clothing top, wherein the inflated bladder is maintained within the clothing top by clip fasteners.

4. The system of claim 3, wherein the clothing top is held in upright position and anchored by the stable structure to keep the clothing top in a stationary position.

5. The system as claimed in claim 1, wherein the maximum diameter of the bladder is greater than the diameter of the fabric when measuring the tensile strength of the fabric, wherein the tensile strength of the fabric is calculated using the recorded pressures and the change in circumference of a measured portion of the apparel.

6. The system as claimed in claim 1, wherein the cross-sectional perimeter of the apparel is determined by generating at least one plane and calculating the intersection of the plane with the 3D scanned data, wherein the cross-sectional perimeters of the apparel and their corresponding coordinates are recorded for various brands and sizes of apparel to create an accurate size representation of the apparel.

7. The system as claimed in claim 1, wherein the stable structure comprises a plurality of holes to allow for air to escape evenly to fill the bladder up.

8. The system as claimed in claim 1, wherein the software application finds the critical dimensional differences and analyzes the magnitude of difference in dimensions of the apparel to provide size recommendation.

9. The system as claimed in claim 1, wherein the filling media source includes at least one of an air compressor, a compressed air tank, an air compressor with a tank or a fan, a polymer foam pump, or a particulate polymer foam tank.

10. The system as claimed in claim 1, wherein the inflatable bladder encases the stable structure and is sealed at the end with at least one of plates, clamps, or fasteners to create an air tight seal allowing complete and even inflation.

11. A method for three-dimensional capture of apparel by three-dimensional scanning and stereo photogrammetry, the method comprising the steps of:

inserting at least one deflated bladder into an apparel and inflating the bladder by a filling media source;

monitoring and maintaining the pressure of the inflated bladder by a pressure regulator with a pressure gauge;

holding and anchoring the inflated apparel in upright position to keep the apparel at a stationary position by a stable structure, wherein the stable structure acts as a skeleton of a typical person who wears the apparel, wherein the stable structure is fixed on the stationary object, ceiling or on the floor which restricts movement of the apparel, wherein the shape and size of the stable structure varies depending upon the shape and size of the apparel;

measuring at least one of, size of the inflated apparel, tensile strength of the fabric of the inflated apparel or cross section perimeter of the inflated apparel, wherein the diameter of the bladder is greater than the diameter of the fabric when measuring the tensile strength of the fabric;

scanning the inflated apparel on the stable structure and exporting the scanned data to at least one software application by a plurality of 3D scanners;

removing unwanted data points and other structures which are not a part of the apparel and analyzing the scanned data to extrapolate dimensions from the scanned data by the software application;

compiling the extrapolated dimensional data to provide an apparel reference ID and storing the apparel reference ID in a searchable database by the secondary software application;

collecting and processing the data by a processor wherein the data is captured by the software application of the electronic device, wherein the processor compares the given apparel's dimensions to at least one apparel dimension in the database; and providing customer with size recommendation via the display or application programming interface (API), wherein the size recommendation is started by inputting apparel reference ID by the customer, wherein the software application finds at least one critical dimensional differences and analyses the magnitude of difference in dimensions of the apparel to provide size recommendation.

12. The method of claim 11, wherein the apparel includes a pair of pants, wherein the deflated bladder is inserted into the pair of pants and is held at the bottom by a cable fastening device, wherein the bladder is maintained at the waist of the pair of pants by fasteners or pins and a stable structure is secured to the ground that maintains the pair of pants in a stationary position.

13. The method of claim 11, wherein the apparel includes a clothing top, wherein the inflated bladder is maintained within the clothing top by clip fasteners.

14. The method of claim 11, wherein the cross-sectional perimeter of the apparel is determined by generating at least one plane and calculating the intersection of the plane with the 3D scanned data, wherein the cross-sectional perimeters of the apparel and their corresponding coordinates are recorded for various brands and sizes of apparel to create an accurate size representation of the apparel.

15. The method of claim 11, wherein the stable structure comprises a plurality of holes to allow for air to escape evenly to fill the bladder up.

16. The method of claim 11, wherein the filling media source includes at least one of an air compressor, a compressed air tank, an air compressor with a tank or a fan, a polymer foam pump, or a particulate polymer foam tank.

17. The method of claim 11, wherein the inflatable bladder is disposed inside the stable structure and is sealed at the end with at least one of plates, clamps, or fasteners to create an air tight seal allowing for complete and even inflation.

18. The method of claim 11, wherein the tensile strength of the fabric is calculated using the recorded pressures and the change in circumference of a measured portion of the apparel.

* * * * *